US012797853B2

(12) United States Patent
Koop et al.

(10) Patent No.: US 12,797,853 B2
(45) Date of Patent: Nov. 17, 2026

(54) APPARATUS FOR CONTROLLED RELEASE OF A LABWARE FROM A THERMAL BLOCK

(71) Applicant: Opentrons LabWorks Inc., Brooklyn, NY (US)

(72) Inventors: Shawn Michael Koop, Cottage Grove, MN (US); Taylor Schlaff Goodman, New York, NY (US); Richard Roser, Bellmawr, NJ (US); James Griszbacher, Mount Kisco, NY (US)

(73) Assignee: Opentrons LabWorks Inc., Long Island City, NY (US)

(*) Notice: Subject to any disclaimer, the term of this patent is extended or adjusted under 35 U.S.C. 154(b) by 790 days.

(21) Appl. No.: 18/199,880

(22) Filed: May 19, 2023

(65) Prior Publication Data

US 2024/0382967 A1 Nov. 21, 2024

(51) Int. Cl.
*B01L 3/00* (2006.01)

(52) U.S. Cl.
CPC ....... *B01L 3/50851* (2013.01); *B01L 3/50857* (2013.01)

(58) Field of Classification Search
None
See application file for complete search history.

(56) References Cited

U.S. PATENT DOCUMENTS 6,197,572 B1 * 3/2001 Schneebeli ......... B01L 3/50851
435/286.2
6,327,888 B1 * 12/2001 Kadlec ................. B21D 43/055
72/405.16
6,638,761 B2 10/2003 Shin et al.
RE39,566 E 4/2007 Elsener et al.
11,376,599 B2 7/2022 Evans et al.
2009/0269835 A1 * 10/2009 Ceremony ................ B01L 7/52
435/286.2
2018/0257077 A1 9/2018 Zenhausern et al.
(Continued)

FOREIGN PATENT DOCUMENTS

CN 211825366 U 10/2020
WO WO-02078849 A1 * 10/2002 .............. B01L 9/523
(Continued)

OTHER PUBLICATIONS

Search Report and Written Opinion for International Application No. PCT/US24/28940, Dated Sep. 11, 2024, 8 pages.
(Continued)

*Primary Examiner* — P. Kathryn Wright
(74) *Attorney, Agent, or Firm* — Lee & Hayes, P.C.

(57) ABSTRACT

An apparatus for controlled separation of a labware from a thermocycler. A thermal block has a slot along a lateral edge thereof. A gear rack includes a set of teeth that are linearly aligned along an upper edge thereof. A gear is positioned to engage the set of teeth such that the gear rotates with lateral movement of the gear rack. A lifting pin is associated with the gear and the lifting pin extends from a position that is offset from a central axis of the gear and toward the thermal block. The lifting pin is disposed proximate to the lateral edge of the thermal block such that, in a first position, the lifting pin is located resting in the slot, and in a second position, the lifting pin is located above the thermal block.

20 Claims, 5 Drawing Sheets

(56) References Cited

U.S. PATENT DOCUMENTS

| | | | | |
|---|---|---|---|---|
| 2020/0101459 | A1* | 4/2020 | Appel | ................. B01L 3/50851 |
| 2021/0121889 | A1 | 4/2021 | Lei et al. | |
| 2023/0020118 | A1 | 1/2023 | Davis et al. | |
| 2024/0382970 | A1 | 11/2024 | Koop | |

FOREIGN PATENT DOCUMENTS

| | | | | |
|---|---|---|---|---|
| WO | WO2002078849 | A1 | 10/2002 | |
| WO | WO-2026005445 | A1 * | 1/2026 | ............. G01N 21/84 |

OTHER PUBLICATIONS

Search Report and Written Opinion for International Application No. PCT/US2024/030080, Dated Nov. 27, 2024, 11 pages.
Office Action for U.S. Appl. No. 18/199,857, dated Jan. 26, 2026, 8 pages.

* cited by examiner

FIG. 1 – Related Art

APPARATUS FOR CONTROLLED RELEASE OF A LABWARE FROM A THERMAL BLOCK

BACKGROUND

Modern life science research encompasses disciplines such as genetics, genomics, proteomics, and synthetic sequencing. In each of these disciplines, the modification, processing, and/or analysis of liquid biological and chemical samples of interest is fundamental. Thus, thermocyclers are integral to life science research. For example, in molecular biology research alone thermocyclers are used, among other things, for DNA sequencing, cloning, generation of probes, quantification of DNA and RNA, studying patterns of gene expression, and detection of sequence-tagged sites.

Thermocyclers are devices capable of precise temperature control. In some instances, a thermocycler can be configured to regulate temperatures in complicated cyclical programs. A thermocycler typically fully encloses a labware containing liquid samples under a lid mechanism to ensure tightly controlled thermal conditions. A thermal block-typically a piece of fabricated metal such as aluminum-thermally couples the labware (and thereby the liquid samples) to a thermal control system of the thermocycler. Because of this ability to hold precise temperatures with little fluctuation, thermocyclers are commonly used for amplification of DNA and RNA samples, such as by Polymerase Chain Reaction (PCR). In PCR, a thermocycler applies rapid thermal changes to liquid biological and chemical samples. Accordingly, thermocyclers are well suited for any laboratory process where strict temperature control is required.

Various laboratory processes require an airtight seal to be created between the lid mechanism of the thermocycler and each individual liquid sample in the labware. In some cases, this is to prevent evaporation of the liquid samples during protocols involving high temperatures. In some other cases, an air tight seal is required to prevent contamination. Therefore, a sealing sheet, often formed of a sheet of compressible material (e.g., a polymer or silicone), is applied to the lid mechanism of the thermocycler so that an airtight seal is created between the lid mechanism and the labware when the lid mechanism is closed.

However, in some instances, the sealing force applied to actuate the airtight seal between the thermocycler lid and the labware create a challenge downstream when trying to remove the labware from the thermal block. That is, the labware often remains adhered to the thermal block at the end of a laboratory process, requiring the labware to be forcefully lifted from the thermal block. This forceful lifting can upset the contents of the labware and lead to spillage, contamination, sample loss, and more. In general, the temperature cycling that occurs during thermocycler processes often causes repeated thermal expansion and contraction of the labware and/or thermal block. As such, the thermal cycling coupled with a strong compression force from the airtight seal can increase the likelihood that the labware ends up needing to be forcefully removed from the thermal block.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
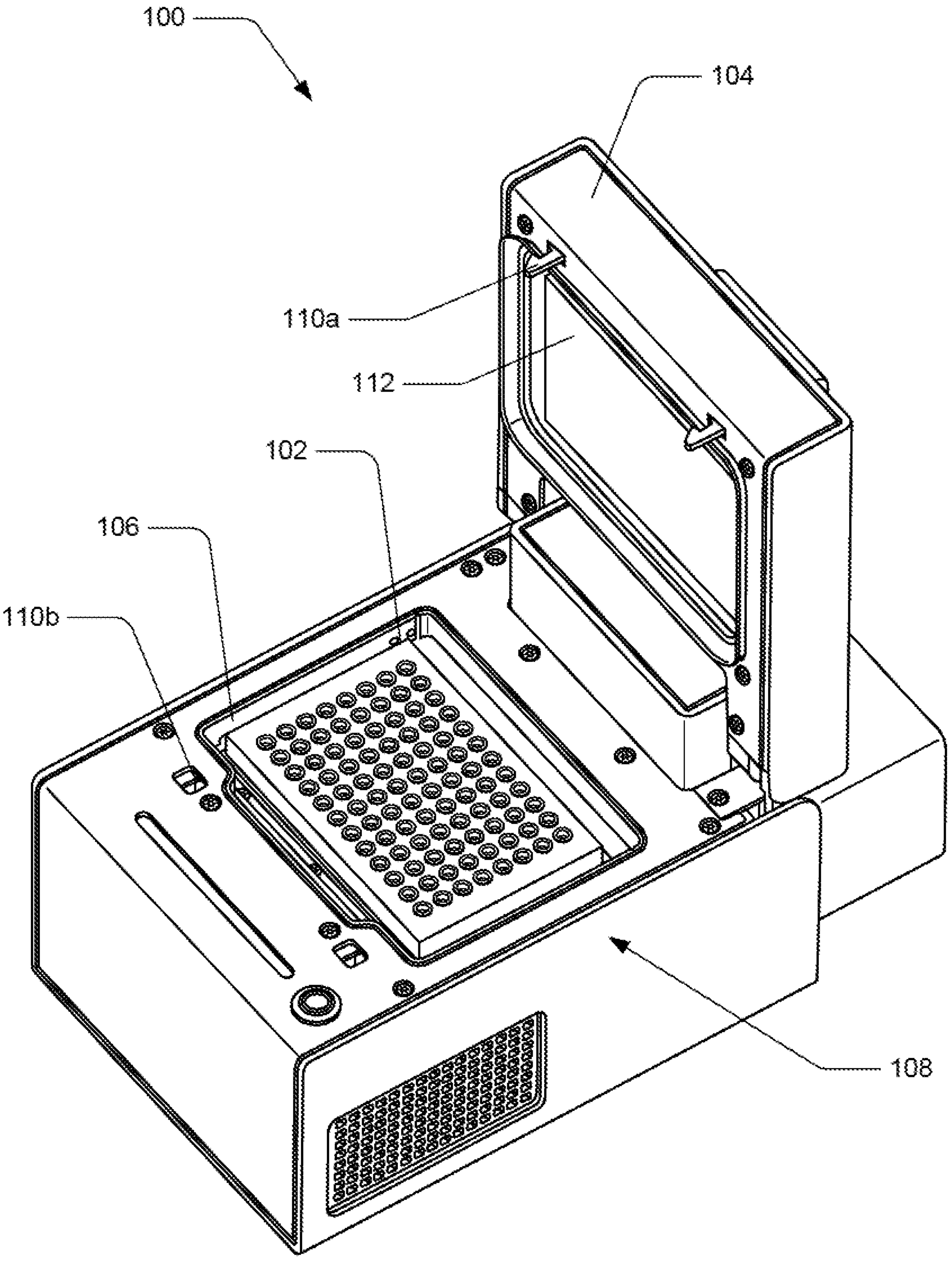
FIG. 1 is an isometric view of a conventional thermocycler device, shown with the thermocycler lid disposed in an open position with a labware disposed within the thermal block of the thermocycler.

FIG. 1 is an isometric view of a conventional thermocycler device 100 that is used, at least in part, to permit a thermal transfer generated in the thermocycler device 100 to liquid samples within a labware 102 configured to be accommodated therein. The labware 102 is a sterile object, and is generally configured to carry multiple liquid samples, typically arranged in an array configuration of wells which isolate the samples (e.g., 96 wells, 384 wells, etc.). The well configuration provides a thermal pathway to the thermal transfer to the liquid samples in the wells of the labware 102. Thermal activity within the thermocycler device 100 may be controlled by an internally arranged thermal control system (not specifically shown).

The thermocycler device 100 includes a lid 104, which is shown disposed in an open position. The labware 102 is shown disposed within a thermal block 106 of the thermocycler device 100. The thermal block 106 thermally couples the labware 102 to the thermocycler device 100 such that the thermal transfer may be controlled by the thermal control system.

As shown in in FIG. 1, the thermal block 106 is typically located within an inner section of the body 108 of the thermocycler device 100. As indicated above, the thermal block 106 and the labware 102 together facilitate thermal coupling of the labware 102 (and thereby the liquid samples) to the thermal control system.

Conventional thermocycler devices, like thermocycler device 100, typically include a lid securing mechanism for closing and securing the lid 104 during operation. An example lid securing mechanism 110*a*/110*b* may include a latch (110*a*) and catch (110*b*) system, such as the push-to-close latch system shown in FIG. 1A. Thus, when the lid 104 is closed, one or more latch members 110*a* located in the lid 104 are pushed in against a mating surface 110*b* in the body

108 to hook around a striker therein to secure the thermocycler lid 104 from inadvertent opening. Moreover, when the lid 104 is closed, a sealing sheet 112, which is disposed on an inside face of the lid 104, is pressed against the upper surface of the labware 102 and the labware is pressed against the thermal block 106. Nevertheless, conventional thermocycler devices, such as that depicted in FIG. 1, frequently suffer from improperly disengaging the labware 102 from the thermal block 106.

In an embodiment of the instant disclosure, the thermocycler device may use the opening movement of the lid of the thermocycler device to actuate a mechanical and/or electrical system/apparatus within the thermocycler device. This actuation may cause a separation of a labware from the thermal block (i.e., a controlled release) after use. For example, the angular motion of the lid as it pivots from closed to open may be converted to cause a linear motion of a component of the mechanical and/or electrical system/apparatus. The linear motion of the component is used to cause rotational movement of one or more gears which are configured to cause a lifting action on a base of the labware, thereby effectuating the desired separation. Other mechanical actuation methods are contemplated and discussed in part below.

Figure 2:
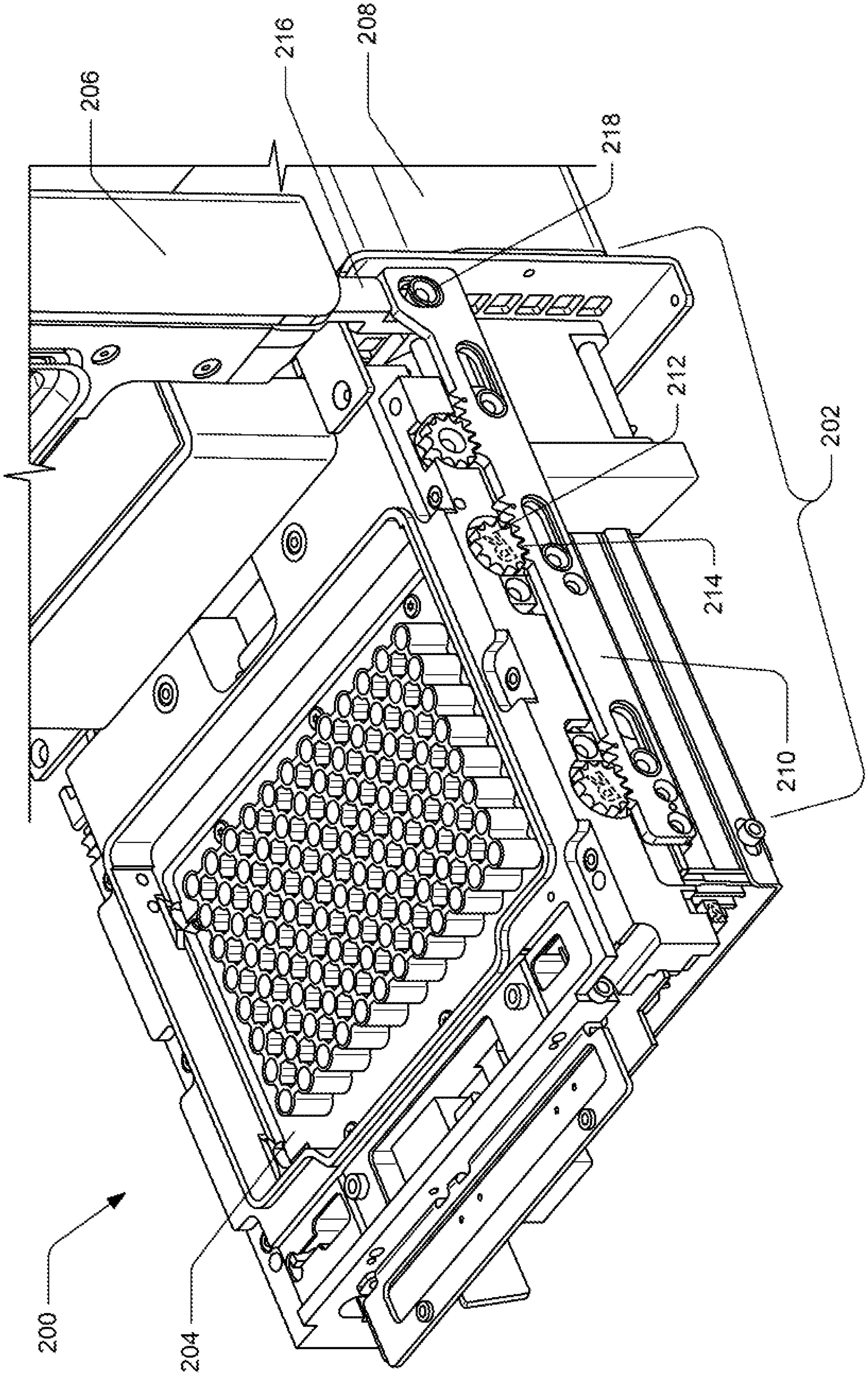
FIG. 2 is an isometric view of a thermocycler device including an apparatus for controlled release of a labware from a thermal block, according to an embodiment of this disclosure.

FIG. 2 depicts an embodiment, according to the instant disclosure, of a thermocycler device 200 including an apparatus 202 for controlled release of a labware (not shown in FIG. 2) from a thermal block 204. A lid 206 of the thermocycler device 200 is partially shown and is disposed in an open position. Inasmuch as the lid 206 is hinged pivotally to the body 208 of the thermocycler device 200, the apparatus 202 may use the angular motion of the pivotally attached lid 206 to assist in the separation of the labware from the thermal block 204. Alternatively, though not shown expressly in the figures, the apparatus 202 may be manually actuated either directly or indirectly via movement of a structure other than the lid 206, for example, via an electrically powered gear motor, a manually manipulated lever/switch, or a tab or flange extending directly from the apparatus with which the apparatus may be manipulated to disrupt the engagement between the labware and the thermal block.

Figure 3A:
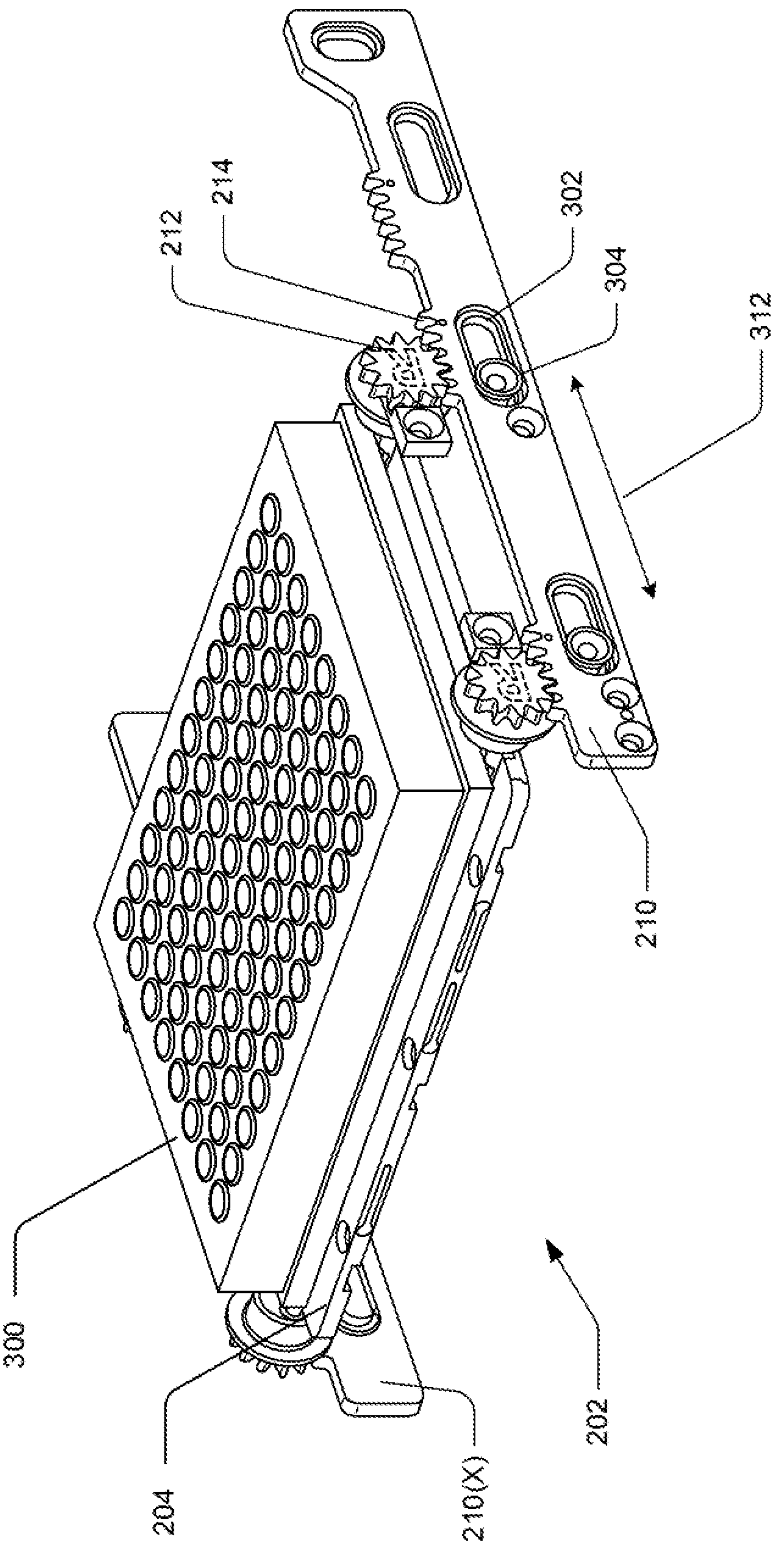
FIG. 3A is an isometric view of the apparatus as depicted in FIG. 2, with the labware disposed proximate to the thermal block, according to an embodiment of this disclosure.
Figure 3B:
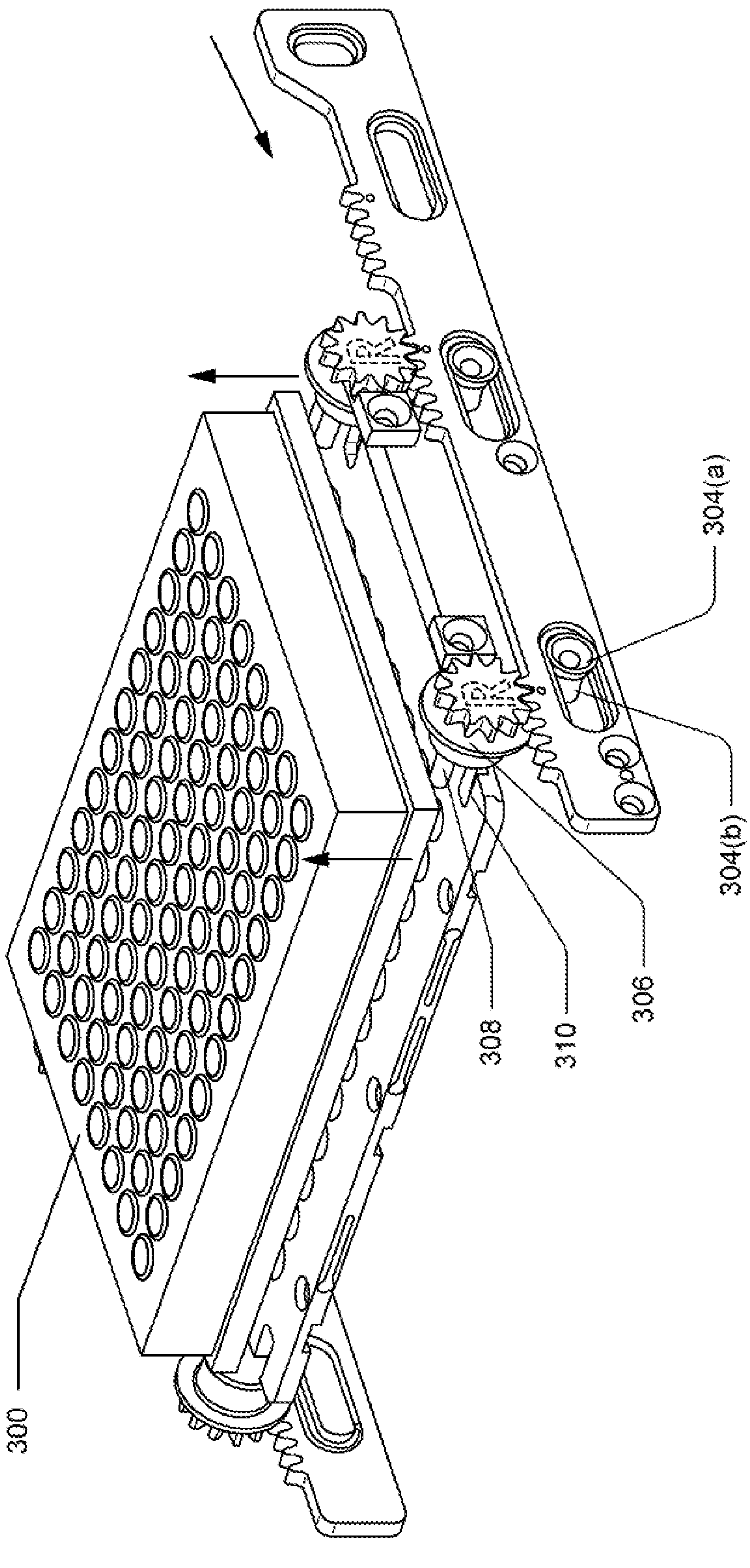
FIG. 3B is an isometric view of the apparatus for controlled release of a labware from a thermal block, as depicted in FIG. 3A, with the labware released from the thermal block and illustrating respective directions of motion of a gear rack and a lifting pin, according to an embodiment of this disclosure.

Turning the embodiment depicted in FIGS. 2, 3A, and 3B, at least some of the primary components of the apparatus 202 for a controlled release of the labware may include a gear rack 210, a gear 212, and a set of teeth 214 on the gear rack 210. The apparatus 202 may be disposed along a side of the body 208 of the thermocycler device 200. The "side" of the body 208 may be a lateral side (as depicted), or the front side, or the rear side. Moreover, more than one apparatus 202 may be included on more than one side, respectively. The apparatus 202 may further be accommodated within a portion of the body 208 that extends outside of the thermal block 204 (and adjacent heat sink areas therein), but not so far as to protrude away from the body 208, thereby minimizing both vertical and horizontal size of the thermocycler device 200. Additionally, this arrangement may provide a space efficient structure that preserves more thermally conductive material in both the thermal block 204 (and the adjacent heatsink portion/s), which is important for uniformity of temperature in the thermal block 204 and the overall performance of the thermocycler device 200. Accordingly, the apparatus 202 may provide a reduced vertical space requirement for implementation as well.

In general, the apparatus 202 may function to separate the labware from the thermal block 204 by shifting the position of the gear rack 210, which causes the gear 212 to rotate (along a fixed axis with respect to the body 208) via engagement with the set of teeth 214. The rotation of the gear 212 ultimately provides a lifting force, as described in more detail below, between the labware and the thermal block 204. Note, as depicted, the gear 212 is fixedly pivotable with respect to the body 208, however, in an alternative embodiment not shown, a gear may be translatable and fixedly pivotable with respect to the gear rack 210, and a set of teeth may be fixedly positioned with respect to the body 208. Moreover, in an embodiment, one or more apparatuses 202 may be incorporated into the thermocycler device, such as the two shown on opposite lateral sides of the thermocycler device 200. For the sake of clarity, the references only explicitly point out the features on one side.

With further respect to the function of the apparatus 202, the gear 212 may engage a rotary cam (a component not shown in FIG. 2, but discussed hereinafter with respect to FIGS. 3A and 3B), which, for example, may be connected to the gear 212, and thus rotate in connection with, or along the same axis of, the gear 212. Additionally, in an embodiment, a lifting pin (also not shown in FIG. 2, but is discussed hereinafter with respect to FIGS. 3A and 3B) may extend from the rotary cam, in a location that is offset from the axis of the gear and beneath the labware. Thus, the lifting pin may be positioned such that, upon rotation of the gear, the movement of the rotary cam causes the lifting pin to shift upward, creating a lifting force with the lifting pin against the underside of the labware. Accordingly, the lifting force of the lifting pin may facilitate separation of the labware from the thermal block 204.

Though many alternative means of actuating the gear rack 210 are conceivable, as stated above, the embodiment depicted in FIG. 2 shows that the apparatus 202 further includes a connection member 216 (e.g., a bar, a lever, a link, etc.) between the gear rack 210 and the lid 206. The connection member 216 may be configured to transfer the force (i.e., a "force transfer bar") associated with movement of the lid 206 to move the gear rack 210 and thereby induce the lifting force described above. The connection member 216 may further have a first end connected to the lid 206 and a second end connected to a rear end of the gear rack 210. In an embodiment, the connection member 216 may be joined to the gear rack 210 via a guide joint 218 (e.g., a link, a fastener, a pivotable joint, a translatable joint, etc.). The guide joint 218 may include a fastening guide portion (e.g., a pin or other structure through at least one aligned aperture), to allow pivotal movement and hold the connection member 216 to the gear rack 210, and a positional guide portion (e.g. a structural interface that allows respective translational movement of the components). That is, in an embodiment, the connection member 216 may be both pivotable about the guide 218 and translatable in movement. Thus configured, the lid 206 may be driven in an upward/clockwise angular direction during opening of the thermocycler lid, and thereby drive the gear rack 210 in a frontward (e.g., positive) linear direction. In contrast, during closing of the lid 206, the connection member 216 may be driven in a downward/counterclockwise angular direction, and thereby drive the gear rack 210 in a rearward (e.g., negative) linear direction.

The translational movement of the gear rack 210 may be effectuated, at least in part, due to the shapes and structural arrangement of the gear rack 210 and the connection member 216. For example, the adjacent ends of the connection member 216 and the gear rack 210 may be correspondingly shaped such that motion of the lid 206, such as the angular motion that occurs when opening or closing the lid 206 via pivoting the connection member 216, forces the gear rack 210 to change position through a sliding translational movement. The translational sliding of the gear rack 210 causes the lifting force between the labware and the thermal block 204. This dual activity is also due, at least in part, to the vertical orientation and elongation of the aperture (see FIGS. 3A and 3B) at which the connection member 216 is attached to the gear rack 210. That is, the joint between the lid 206 and the apparatus 202 allows for vertical sliding translational movement of the lid 206, and pivoting the lid 206. Further, the guide 218 functions to shift the gear rack 210, in part by using the interaction between the adjacent profiled surfaces of the gear rack 210 and the connection member 216, thus literally guiding and forcing the components to move with respect to each other in response to the movement of the lid 206. That is, in an embodiment, the sloped end of the gear rack 210 interfaces with the profiled shape (i.e., the squared midpoint) of the connection member 216.

Note, as indicated above with respect to the potential for an embodiment to have one or more than one apparatus 202, it is to be understood that the additional components, discussed in greater detail hereinafter, may also be incorporated and/or claimed as one or as multiples of the components (i.e., one or more gears, a plurality of sets of teeth, at least one guide, etc.). Nevertheless, the components may be discussed in terms of singularity for convenience and for simplicity, unless, for example, a specific description of a plurality is helpful to explain a particular aspect of the disclosure.

FIGS. 3A and 3B depict the apparatus 202 separate from the body 208 of the thermocycler device 200. In FIG. 3A, a labware 300 is depicted in a position sealed or otherwise in abutment of the thermal block 204. In contrast, FIG. 3B depicts the labware 300 as lifted from the thermal block 204. Note, FIG. 3A further depicts the reference 210(X) merely to indicate the presence (and potential embodiment) of a secondary gear rack 210(X) (and other unreferenced accompanying lift componentry) to be mirror-positioned on the opposite lateral side of the thermal block 204.

In an embodiment, the gear rack 210 may have a shape profile of an elongated flattened bar, where the thickness dimension of the bar is less than a width of the bar, and the width dimension of the bar is less than a length dimension of the bar. The gear rack 210 may be positioned such that the length dimension thereof extends in a front to back direction of the thermocycler device 200, and the width dimension extends in a top to bottom direction of the thermocycler device 200.

The gear rack 210 may include an aperture 302 (e.g., slot, cavity, pathway, channel, hole, etc.) that passes through the gear rack 210 in the thickness direction and that extends elongatedly in the direction of the length of the gear rack 210. The aperture 302 may be located proximate to the set of teeth 214, though not necessarily in alignment either in length or vertical disposition along the length of the gear rack 210. In an embodiment, the aperture 302 may have a non-linear profile inside wall shape. That is, in an embodiment as depicted, the inner wall surface of the aperture 302 may have a wider opening dimension closer to the outer edge, which is the side of the gear rack 210 facing away from the thermal block 204. Alternatively, in an embodiment not shown, the aperture 302 may have a straight profile (i.e., linear and non-slanted with respect to the outer face of the gear rack 210) inner wall surface, or a varied wall surface having more than one dimensional change in the wall shape (or depth into the thickness of the gear rack 210).

Inasmuch as the gear rack 210 may be translatable in a front to back direction (when embodied as depicted on the lateral side of the thermocycler device 200), the set of teeth 214 may be disposed on an upper side (in the width direction) of the gear rack 210. The set of teeth 214 may thus protrude away from the upper side of the gear rack 210 in the width direction and may be disposed consecutively in a linear extension along the length direction on the upper side of the gear rack 210. Positioned as such, the set of teeth 214 are configured to be aligned to engage with the gear 212. As such, the gear 212 may be a circular gear having teeth around the perimeter with a pitch that corresponds to roll within the pitch of the set of teeth 214 on the gear rack 210. Moreover, when aligned as shown, upon movement of the gear rack 210 translationally in the back to front motion, the set of teeth 214 will engage the gear 212 and cause the gear to rotate about the axis.

In an embodiment, the axle (not shown expressly) of the gear 212 may be fixed with respect to a position in or adjacent to the thermal block 204. In combination with this, a guide pin 304 may be positioned within aperture 302 and the axis of the guide pin 302 may be fixed to a portion of the thermocycler device 200 beneath the thermal block 204. By fixing the guide pin 304 relative to the fixed axle of the gear 212, the gear rack 210 may be secured vertically in place with the set of teeth 214 positioned to engage the gear 212. Additionally, inasmuch as the guide pin 304 facilitates the translational movement and horizontal stability of the gear rack 210, the guide pin 304 may further have an outer profile that matches the profile shape of the inner wall surface of the aperture 302. For example, as depicted, an outer end (304(*a*), see FIG. 3B) of the guide pin 304 may have a diameter corresponding to the larger dimension of the aperture 302 and a diameter of a subsequent section (304(*b*), see FIG. 3B) of the guide pin 304 corresponding to the smaller dimension of the aperture 302. Thus, in an embodiment, the outer diameter of the guide pin 304 may taper, either continuously or stepwise, to correspond to the dimensions of the aperture 302 so as to permit lateral movement of the gear rack 210 with minimal vertical displacement. As such, the guide pin 304 is able to reduce a risk of the gear rack 210 losing the alignment position between the set of teeth 214 and the gear 212.

To effectuate the actual lifting force on the labware 300, a rotary cam 306 may be connected to an inner facing surface of the gear 212 (or connected to the axle thereof) so as to cause the rotary cam 306 to rotate as well. Furthermore, a lifting pin 308 may extend from the rotary cam 306. In an embodiment, the lifting pin 308 is disposed offset from the axis of the gear 210 and/or the rotary cam 306. Further, the lifting pin 308 may extend inwardly toward the thermal block 204. Accordingly, when the gear rack 210 is in a first position (e.g., a rearward or shifted laterally rearward, where the lid 206 is closed and the labware 300 is on the thermal block 204), the lifting pin 308 rests in a slot 310. The slot 310 may be defined in a lateral (or otherwise adjacent) edge of the thermal block 204, which is below the upper surface of the thermal block 204 and beneath the labware 300 (see FIG. 3A). In contrast, when the gear rack 210 is in a second position (e.g., a frontward or shifted laterally frontward, where the lid is open), the lifting pin 308 is raised in a lifted position above the upper surface of the thermal block 204, and though still beneath the labware 300, the labware is separated from the thermal block 204 (see FIG. 3B).

Notably, in an embodiment having more than one set of corresponding elements of the apparatus 202 (i.e., more than one gear, rotary cam, lifting pin, set of teeth, aperture, and guide pin), a lateral distance 312 between the apertures, gears, rotary cams, lifting pins, sets of teeth, and/or guide pins may be determined so that the gears operate in a staggered timing when the gear rack is moved. As such, the lifting force would also be staggered with each lifting pin being lifted at a different time. An advantage that may occur is that by staggering individual rotary cams in time, a first portion of the labware 300 is engaged slightly prior to the second (or more) portions, which facilitates a gentler levering of the labware 300 from the thermal block 204. That is, staggering the force applied in the manner described above allows all of the applied mechanism force to act against a smaller number of wells (the part of the labware 300 that is adhering from the thermal activity) near the surface, instead of having to break all of the wells' adhesions to the thermal block 204 all at once. Therefore, this gradual approach generally results in a less violent release of the labware 300 and better preservation of sample integrity.

Additionally, and/or alternatively, it is contemplated that the apparatus 202 may function to separate the labware from the thermal block 204 without using gears at all. For example, in an embodiment not shown, a separation apparatus may include a "lifting" bar—pinned to the thermocycler similarly as the gear rack 210 described above, but without teeth—with one or more protrusions that extend from the lifting bar to be positioned near the underside of the labware. Such a lifting bar may be shifted to force the protrusions up against the labware through the thermal block and induce separation. This may be accomplished either manually after opening the lid of the thermocycler, or via the actuation of opening of the lid. For example, by way of providing either a lever attached to the force transfer bar (if manually) or by using linkage bars connected to the lid, a different type of mechanical structure may provide a lifting force between the labware and the thermal block 204.

In an additional and/or alternative embodiment, the apparatus 202 may be configured to perform a "wiggle" procedure during the opening of the lid 206. For example, while the above embodiments may describe a more continuously driven upward disengagement, a wiggle procedure may be more variable in direction such that the separation occurs by an alternating process of lifting and lowering the labware to ease it up more carefully. In an embodiment, the wiggle procedure may be implemented so as to gradually engage in a constant contact state to lift/lower the labware, at a gradually increasing rate (i.e., lifting up+x mm/msec, then lowering down−x mm/msec; where x is a predetermined value). Alternatively, in another embodiment, the wiggle procedure may be implemented to lift/lower the labware at a variable rate (i.e., lifting up+x mm/msec, then lowering down−y mm/msec; where x and y are different predetermined values). In such an embodiment, the lighter nudge on the labware 300 may be more advantageous than attempting to drive the lifting pin 308 continuously. That is, the wiggle procedure may allow more gradual engagement with the labware 300 while accounting for potential positioning tolerances of each thermocycler and labware 300. Accordingly, this approach may induce a lighter and more gradual release of the labware 300, while minimizing sudden pops when dealing with very stuck labware.

For a non-limiting example, a wiggle procedure may involve:

1) driving the lifting pin 308 1 mm upward,
2) driving the lifting pin 308 1 mm downward,
3) driving the lifting pin 308 2 mm upward,
4) driving the lifting pin 308 2 mm downward,
5) driving the lifting pin 308 3 mm upward,
6) driving 3 mm the lifting pin 308 downward, and
7) so on, increasing by a predetermined amount (e.g., 0.5 mm, 1 mm, 1.5 mm, etc.) until either the limit of the travel of the lifting pin 308 is reached, or until the labware is deemed to have been separated.

Figure 4:
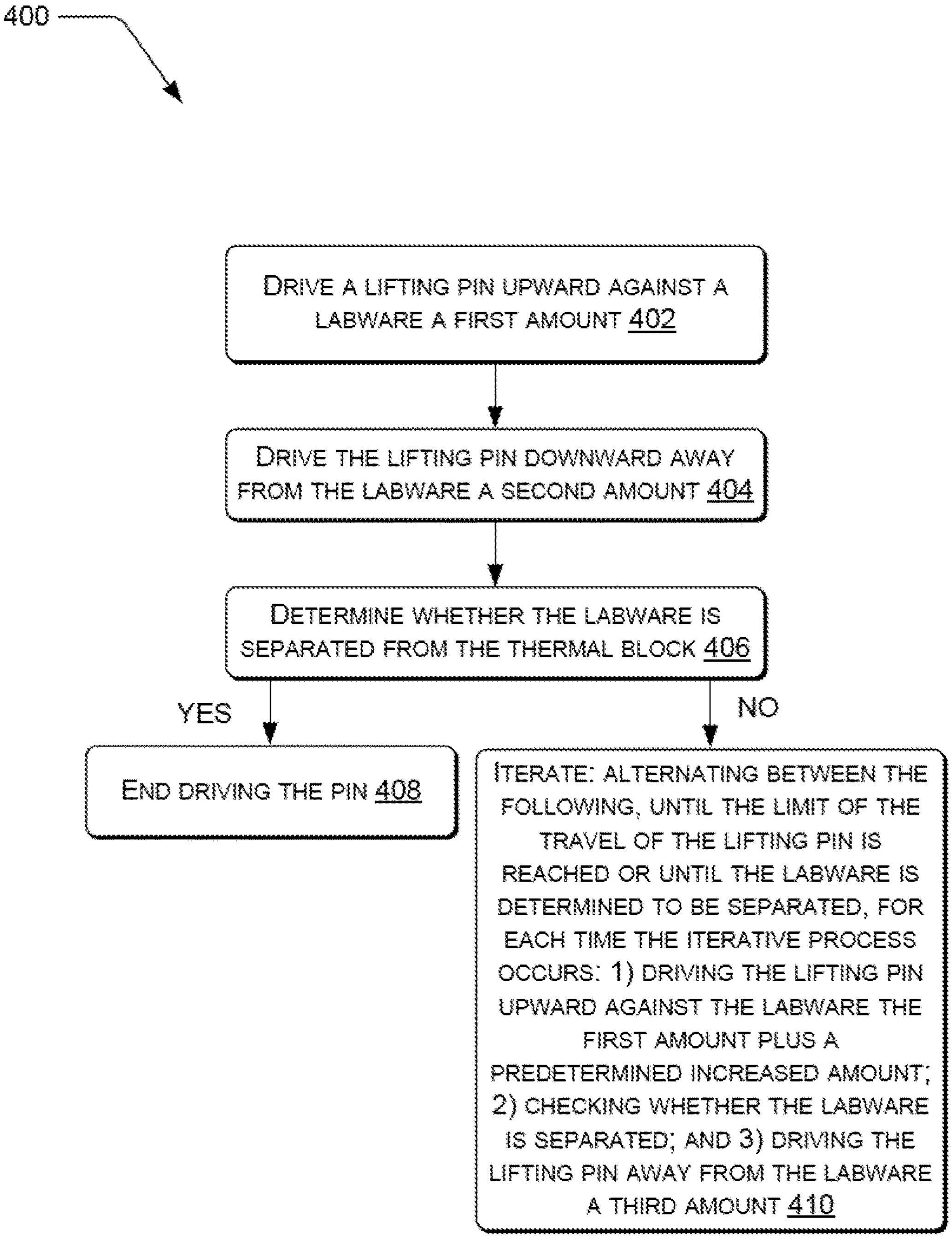
FIG. 4 is a schematic flow diagram of a method of separating a labware from a thermal block, according to an embodiment of this disclosure.

FIG. 4 illustrates an embodiment of a method 400 of separating a labware from a thermal block in a thermocycler device. The method 400 may include a step 402 of driving a lifting pin upward against the labware a first amount. In step 404, driving the lifting pin upward against the labware a second amount, where the first amount and the second amount may be different or may be equivalent. In step 406, it is determined whether the labware is separated from the thermal block. (It is noted, that in some instances, it may be determined whether the labware was sufficiently separated right after step 402, as well.) If the labware is separated, then the method 400 proceeds to step 408, where the process is terminated and the pin is not driven further. If the labware is not separated, then the method 400 proceeds to step 410, which is an iteration of alternating between the following, until the limit of the travel of the lifting pin is reached or until it is determined to be separated, for each time the iterative process occurs: 1) driving the lifting pin upward against the labware the first amount plus a predetermined increased amount; 2) checking whether the labware is separated; and 3) driving the lifting pin away from the labware a third amount, where the third amount may be different or equivalent to the first amount plus the predetermined increased amount.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and/or indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus for controlled separation of a labware from a thermal block, the apparatus comprising:

a thermal block configured to accommodate the labware thereon and to control a temperature of the labware when in use, the thermal block having a slot extending inwardly into a side of the thermal block such that the slot is open along an upper surface of the thermal block and open through a lateral edge of the side of the thermal block;

a gear rack including a set of teeth that are linearly aligned along an upper edge thereof, the gear rack being oriented to extend adjacent the lateral edge of the thermal block;

a gear positioned to engage the set of teeth such that the gear rotates with lateral movement of the gear rack; and a lifting pin extending from a rear side of the gear, the lifting pin extending from a position on the rear side of the gear that is radially offset from a central axis of the gear and toward the thermal block, the lifting pin being disposed proximate to the lateral edge of the thermal block such that, in a first position, the lifting pin is located resting in the slot, and in a second position, the lifting pin is located above the thermal block, wherein, when the gear rack is moved, the gear rotates, causing the lifting pin to be lifted from the first position to the second position, such that when a labware is placed on the thermal block, the lifting pin lifts the labware away from the thermal block.

2. The apparatus of claim 1, further comprising a connection member that couples a lid of the apparatus to the gear rack.

3. The apparatus of claim 2, wherein the connection member is coupled to the lid such that an angular rotation of the lid causes a translational movement of the gear rack.

4. The apparatus of claim 1, further comprising a rotary cam disposed between the gear and the lifting pin.

5. The apparatus of claim 1, further comprising a connection member connected to the gear rack in a vertically oriented elongated guide aperture.

6. The apparatus of claim 1, wherein the gear is fixed axially with respect to the thermal block.

7. The apparatus of claim 1, wherein the gear rack includes an elongated aperture that extends in a length direction of the gear rack.

8. An apparatus for controlled separation of a labware from a thermal block, the apparatus comprising:

a thermal block configured to accommodate the labware thereon and to control a temperature of the labware when in use, the thermal block having a slot extending inwardly into a side of the thermal block such that the slot is open along an upper surface of the thermal block and open through a lateral edge of the side of the thermal block;

a gear rack including a set of teeth that are linearly aligned along an upper edge thereof, the gear rack being oriented to extend adjacent the lateral edge of the thermal block;

a gear positioned to engage the set of teeth such that the gear rotates with lateral movement of the gear rack;

a connection member configured to couple the gear rack to a lid of the apparatus; and a lifting pin extending from a rear side of the gear, the lifting pin extending from a position on the rear side of the gear that is radially offset from a central axis of the gear and toward the thermal block, the lifting pin being disposed proximate to the lateral edge of the thermal block such that, in a first position, the lifting pin is located resting in the slot, and in a second position, the lifting pin is located above the thermal block, wherein, when the lid is opened, the gear rack is moved, and the gear rotates, causing the lifting pin to be lifted from the first position to the second position, such that when a labware is placed on the thermal block, the lifting pin lifts the labware away from the thermal block.

9. The apparatus of claim 8, wherein an end of the gear rack coupled to the connection member has a profile shape that corresponds to a profile shape of the connection member, whereby surface engagement between the end of the gear rack and the connection member causes the gear rack to shift laterally.

10. The apparatus of claim 8, wherein the set of teeth is a first set of teeth, and the gear is a first gear, wherein the gear rack further includes a second set of teeth, wherein the apparatus further comprises a second gear, and wherein movement of the first gear and the second gear is staggered in time.

11. The apparatus of claim 8, further comprising a rotary cam connected axially to the gear, the lifting pin extending from the rotary cam.

12. The apparatus of claim 8, wherein the gear is embedded in the lateral edge of the thermal block.

13. The apparatus of claim 8, wherein the gear rack includes a plurality of apertures with respective guide pins securing the gear rack in position through the respective plurality of apertures.

14. The apparatus of claim 13, wherein the guide pins facilitate stable translational motion of the gear rack as the set of teeth engages the gear.

15. An apparatus for controlled separation of a labware from a thermal block, the apparatus comprising:

a thermal block configured to accommodate the labware thereon and to control a temperature of the labware when in use, the thermal block having:

a first side, a second side opposite the first side, a first slot extending inwardly into the first side of the thermal block such that the first slot is open along an upper surface of the thermal block and open through a first lateral edge of the thermal block, and a second slot extending inwardly into the second side of the thermal block such that the second slot is open along an upper surface of the thermal block and open through a second lateral edge of the thermal block;

a pair of gear racks disposed on opposite lateral sides of the thermal block in line with the first side and the second side of the thermal block, respectively;

a pair of gears positioned to engage the respective gear racks of the pair of gear racks, whereby engagement causes the pair of gear racks to move laterally; and a pair of lifting pins extending from rear sides, respectively, of the pair of gears, the pair of lifting pins extending inwardly toward each other from a position on the rear sides of the respective gears, which position is offset from respective central axes of the pair of gears, the pair of lifting pins being disposed proximate to the respective first lateral edge and the second lateral edge of the thermal block such that, in a first position, the pair of lifting pins is located resting beneath an upper surface of the thermal block, and in a second position, the pair of lifting pins is located above the thermal block.

16. The apparatus of claim 15, further comprising a lid connected to the pair of gear racks.

17. The apparatus of claim 16, wherein, when the lid is opened, the pair of gear racks moved laterally.

18. The apparatus of claim 15, further comprising a pair of rotary cams disposed between the pair of lifting pins and the pair of gears.

19. The apparatus of claim 15, further comprising a pair of sets of linearly aligned teeth, respectively, disposed along upper edges of the pair of gear racks to engage the pair of gears.

20. The apparatus of claim 15, wherein respective engagement of the pair of gears is staggered in time.

* * * * *